(12) United States Patent
Yamanaka et al.

(10) Patent No.: US 9,531,963 B2
(45) Date of Patent: Dec. 27, 2016

(54) IMAGE CAPTURING DEVICE AND IMAGE CAPTURING SYSTEM

(71) Applicants: Yuji Yamanaka, Kanagawa (JP); Kensuke Masuda, Kanagawa (JP); Go Maruyama, Kanagawa (JP)

(72) Inventors: Yuji Yamanaka, Kanagawa (JP); Kensuke Masuda, Kanagawa (JP); Go Maruyama, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 388 days.

(21) Appl. No.: 14/031,388

(22) Filed: Sep. 19, 2013

(65) Prior Publication Data
US 2014/0098212 A1 Apr. 10, 2014

(30) Foreign Application Priority Data

Oct. 9, 2012 (JP) ................................. 2012-224410
Jul. 29, 2013 (JP) ................................. 2013-156748

(51) Int. Cl.
*H04N 5/30* (2006.01)
*H04N 5/225* (2006.01)

(52) U.S. Cl.
CPC .............. *H04N 5/30* (2013.01); *H04N 5/2254* (2013.01)

(58) Field of Classification Search
None
See application file for complete search history.

(56) References Cited

U.S. PATENT DOCUMENTS

| 6,947,142 | B2 * | 9/2005 | Chen | G01N 21/251 |
| | | | | 205/226 |
| 7,433,042 | B1 * | 10/2008 | Cavanaugh | G01J 3/02 |
| | | | | 356/419 |
| 8,081,309 | B2 * | 12/2011 | Kobayashi | G01J 3/06 |
| | | | | 356/318 |
| 8,358,365 | B2 * | 1/2013 | Tanaka | H04N 5/2254 |
| | | | | 348/335 |
| 2005/0185178 | A1 * | 8/2005 | Gardner | G01J 3/02 |
| | | | | 356/301 |
| 2006/0279647 | A1 * | 12/2006 | Wada | H04N 5/332 |
| | | | | 348/272 |

(Continued)

FOREIGN PATENT DOCUMENTS

JP 2001-099710 4/2001
JP 2005-017347 1/2005

(Continued)

OTHER PUBLICATIONS

U.S. Appl. No. 13/960,067, filed Aug. 6, 2013.

*Primary Examiner* — Reza Aghevli
(74) *Attorney, Agent, or Firm* — Oblon, McClelland, Maier & Neustadt, L.L.P.

(57) ABSTRACT

The image capturing device includes an optical system that focuses lights from an object to generate optical information, a filter provided near a diaphragm position of the optical system, the filter having a plurality of types of spectral characteristics, a sensor that converts the optical information of the object to electronic data, the sensor providing a plurality of spectral transmittance values that sequentially and spatially change, and a lens array having a plurality of lenses being arranged in substantially parallel in a direction of a two-dimensional surface of the sensor.

11 Claims, 6 Drawing Sheets

(56) References Cited

U.S. PATENT DOCUMENTS

| | | | |
|---|---|---|---|
| 2009/0219435 A1* | 9/2009 | Yuan | G02B 5/208 348/360 |
| 2010/0056928 A1* | 3/2010 | Zuzak | A61B 5/0071 600/476 |
| 2011/0206291 A1* | 8/2011 | Kashani | A61B 3/12 382/255 |
| 2012/0008023 A1* | 1/2012 | Wajs | H04N 1/409 348/273 |
| 2012/0035646 A1* | 2/2012 | McCrystle | A61F 2/01 606/200 |
| 2012/0035647 A1* | 2/2012 | Bregulla | A61F 2/01 606/200 |
| 2012/0038790 A1* | 2/2012 | Kelly | G02B 26/0833 348/226.1 |

FOREIGN PATENT DOCUMENTS

| | | |
|---|---|---|
| JP | 2008-216479 | 9/2008 |
| JP | 2010-263353 | 11/2010 |

\* cited by examiner

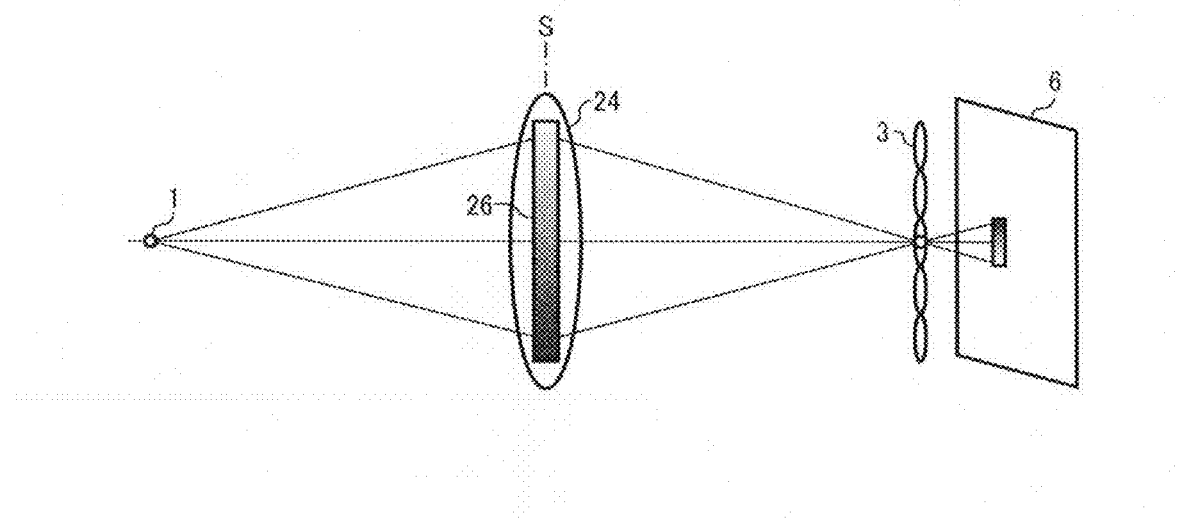

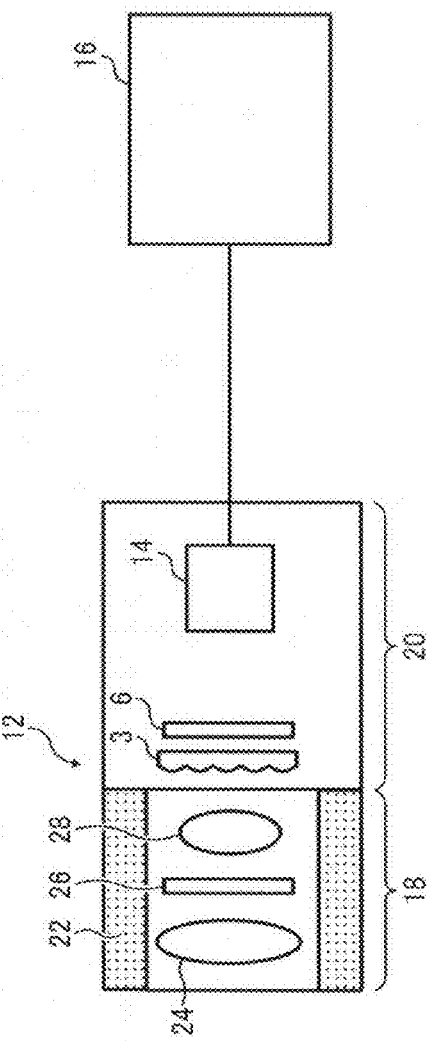
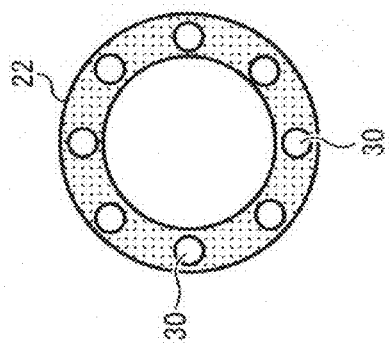

SHORT-WAVELENGTH SIDE        LONG-WAVELENGTH SIDE

IMAGE CAPTURING DEVICE AND IMAGE CAPTURING SYSTEM

CROSS-REFERENCE TO RELATED APPLICATIONS

This patent application is based on and claims priority pursuant to 35 U.S.C. §119 to Japanese Patent Application Nos. 2012-224410, filed on Oct. 9, 2012, and 2013-156748, filed on Jul. 29, 2013, in the Japan Patent Office, the entire disclosure of which is hereby incorporated by reference herein.

BACKGROUND

1. Technical Field

The present invention generally relates to an image capturing device that obtains spectral information from an object, and an image capturing system provided with the image capturing device.

2. Description of the Related Art

The spectral reflectance or the state of the object may be obtained through evaluating the spectral information of the object, which may be measured using a spectrometer such as a prism, grating, or liquid crystal tunable filter. While a spectrum of a point or a line of the object can be measured at once using the spectrometer, a surface of the object is usually measured by scanning the object using a linear spectrometer. Especially when the object is a moving object, such as a cell, measuring the spectrum of the object surface with improved accuracy has been difficult.

Japanese Patent Application Publication No. JP2001-99710-A discloses a method of estimating a spectrum of an object from a multi-band image, which is generated based on a plurality of original images each being captured using a wavelength variable filter. More specifically, the wavelength variable filter is used to change a wavelength range corresponding to each channel to obtain a plurality of original images of the object. The spectrum of the object is estimated using the multi-band image generated based on the plurality of original images. Since switching of the wavelength range is required, a spectral image of the plurality of channels cannot be measured at once. Assuming that the number of channels is equal to or greater than 10, the channel of the wavelength variable filter needs to be changed for 10 times or more to obtain a band image for each channel, thus requiring processing time. Especially when the object is a moving object, the accuracy in measuring the spectrum may greatly suffer.

SUMMARY

Examples embodiments of the present invention include an image capturing device and an image capturing system having the image capturing device. The image capturing device includes an optical system that focuses lights from an object to generate optical information, a filter provided near a diaphragm position of the optical system, the filter having a plurality of types of spectral characteristics, a sensor that converts the optical information of the object to electronic data, the sensor providing a plurality of spectral transmittance values that sequentially and spatially change, and a lens array having a plurality of lenses being arranged in substantially parallel in a direction of a two-dimensional surface of the sensor. The lights from the object pass through the respective positions of the sensor to simultaneously form a plurality of types of spectral image of the object on an image plane of the sensor.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is an illustration for explaining the theory of image capturing, using an image capturing device;

FIGS. 2A and 2B (FIG. 2) are a schematic diagram illustrating a structure of an image capturing system provided with an image capturing device according to an example embodiment of the present invention;

Figure 3:
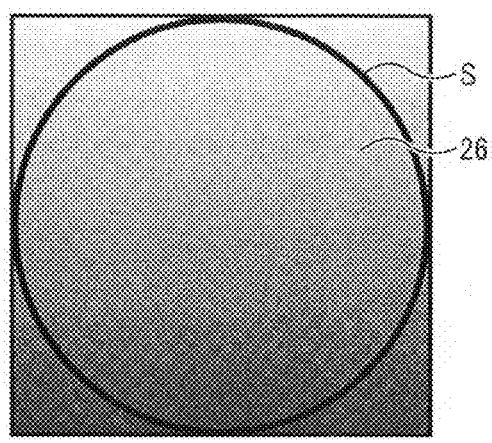
FIG. 3 is a front view illustrating a filter and a diaphragm of the image capturing device of FIG. 2, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, the theory of image capturing is explained using an optical system as an example. In this example, the optical system includes a single lens 24 (may be referred to as the "main lens") having a diaphragm position S along the center line. Along the center line of the main lens 24, a filter 26 having a plurality of types of spectral characteristics is provided. The spectral transmittance sequentially changes, depending on a specific position on the filter 26.

For simplicity, FIG. 1 illustrates the filter 26 as it is positioned inside the lens 2. It is to be noted that the actual position of the filter is not within the lens, but near the lens.

The spectral transmittance values in the filter 26 may sequentially change in any direction on the same plane. For example, referring to FIG. 1, along the plane that is orthogonal to the optical axis of the main lens 24, the spectral transmittance may sequentially change in the upward-downward direction, the direction orthogonal to the upward-downward direction, or the direction diagonal to the upward-downward direction.

Still referring to FIG. 1, a micro-lens array (MLA) 3 is provided near an image plane 6 at which lights from the main lens 24 are focused. The image plane 6 has a sensor, in which a plurality of light receiving elements are arranged to form a light receiving element array. For simplicity, the reference numeral 6 may indicate the light receiving element array of the sensor. In the MLA 3, a plurality of micro-lenses are arranged in a direction that is substantially parallel to a two-dimensional, planar direction. In this example, the ratio between the diameter of the micro-lens of the MLA 3, and the diameter of each one of the light receiving elements of the light receiving element array 6 is about, from 30:1 to 10:1.

The light receiving element array 6 is implemented by a monochrome sensor such that a color filter is not provided for each pixel. In this example, the light receiving element array may be alternatively referred to as the monochrome sensor. More specifically, if a color sensor is used, information from different parts of the filter at the sensor may not match with information obtained from the MLA 3, thus making difficult to detect spectral characteristics. In view of this, a monochrome sensor is usually used.

The light receiving element array 6 functions as a sensor that converts optical information obtained from the lights focused by the optical system, into electronic data. Of the lights from an arbitrary point 1 of the object, a light flux that is incident to an aperture of the main lens 24 is used to measure the spectral reflectance of the point 1 of the object. The light flux incident to the main lens 24 is a collection of a countless number of light rays, which respectively pass through different points of the diaphragm position S.

The filter 26 is provided near the diaphragm position S of the main lens 24, such that the light rays pass the filter 26. More specifically, the light rays respectively pass through different positions on the filter 26, which have different spectral transmittance values depending on the respective positions on the filter 26. The light rays passing through the filter 26 converge at a position near the MLA 3, and further reach at the respective positions on the sensor on the image plane 6. Since the positions at the sensor surface (image plane 6) respectively correspond to the positions on the filter 26 through which the light rays pass, the spectral reflectance of the arbitrary point 1 of the object can be measured at once. More specifically, the image formed on the sensor (image plane 6) have a plurality of types of spectral information for that point 1 of the object.

In FIG. 1, only the single point 1 of the object along the optical axis is shown for the descriptive purposes. The spectral reflectance for the two-dimensional plane may be measured at once for any point, which is provided off the optical axis. For example, in a substantially similar manner as described above, the light rays diffused from a point of the object, which is different than the arbitrary point 1 of the object, pass through the filter 26 at different positions to form an image indicating a plurality of types of spectral information for that point of the object. Through image processing, the plurality of types of spectral information of the object 1, which are obtained as described above for more than one point of the object 1, may be organized according to the spectral characteristics, thus simultaneously generating a two-dimensional image indicating different spectral characteristics.

Based on this principle, by providing the filter 26 having a plurality of types of spectral characteristics near the diaphragm position S of the main lens 24, the two-dimensional image indicating different spectral characteristics of the object can be instantly measured. In this example, the position near the diaphragm position S not only includes the diaphragm position S, but also the position through which lights pass at various angles of view.

FIGS. 2A and 2B illustrate an image capturing system 10 according to an example embodiment of the present invention. Referring to FIG. 2B, the image capturing system 10 includes an image capturing device 12 that obtains spectral information from an object and generates a spectral image of a plurality of types based on the spectral information, and a spectrum calculator 16. The image capturing device 12 includes a field-programmable gate array (FPGA) 14, which generates a spectral image of a plurality of types based on the spectral information. The spectrum calculator 16 includes a central processing unit (CPU), a read only memory (ROM), and a random access memory (RAM). The spectrum calculator 16 calculates spectral reflectance of each pixel in the spectral image generated by the FPGA 14 to obtain a spectrum of the object.

The image capturing device 12 mainly includes a lens module 18, and a camera 20 incorporating the FPGA 14 therein. Alternatively, the FPGA 14 may be provided outside the image capturing device 12.

The lens module 18 includes a lens tube 22, the main lens 24 functioning as an optical system within the lens tube 22, the filter 26 provided near the diaphragm position of the main lens, and a lens 28. The camera 20 includes a MLA 3 functioning as a lens array, the monochrome sensor 6, and the FPGA 14. In this example, a plurality of micro-lenses is arranged in a direction orthogonal to an optical axis of the main lens 24 to form the MLA 3.

As illustrated in FIG. 2A, at the edge of the lens tube 22, a plurality of LEDs 30 each functioning as a light source is embedded in the lens tube 22, in equal distance along the circumferential direction. With the LEDs 30, the image capturing device 12 is able to obtain spectral information, without being influenced by environmental conditions.

FIG. 3 is a front view illustrating the filter 26 and the diaphragm S, according to an example embodiment of the present invention.

Figure 4:
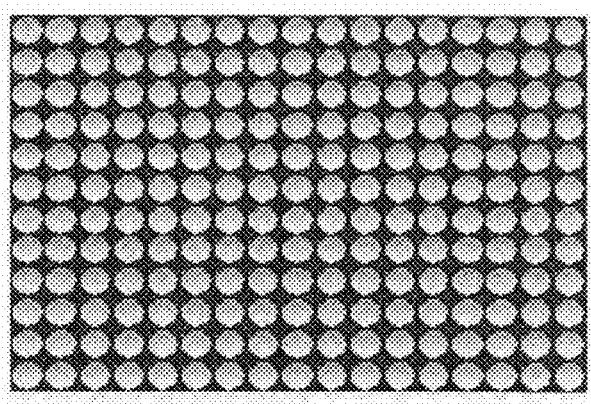
FIG. 4 is an illustration of an example image captured by the image capturing device of FIG. 2.

The filter 26 has a lower section having the spectral transmittance with a short-wavelength peak value, and an upper section having the spectral transmittance with a long-wavelength peak value. As illustrated in FIG. 4, the captured image that is captured using the filter 26 is composed of macro-pixels, represented by small circles, which are arranged in a corresponding manner. The shape of circle corresponds to the shape of the diaphragm S of the single-lens, which has the circular shape. These macro-pixels together form a single image.

Figure 5:
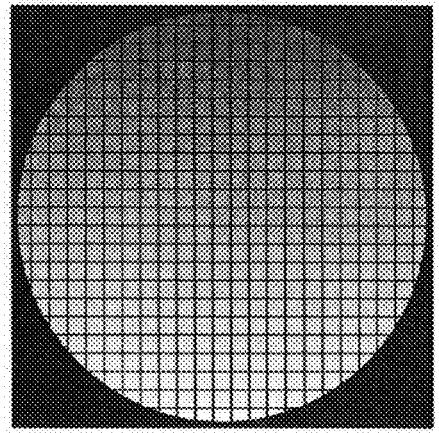
FIG. 5 is an illustration of an enlarged view of a macro-pixel in the captured image of FIG. 4.

Each of the macro-pixels is formed right below each of small lenses (micro-lenses) of the MLA 3. The diameter of the macro-pixel is substantially equal to the diameter of the micro-lens of the MLA 3. As illustrated in FIG. 1, the light ray passing through the lower section of the filter 26 reaches the sensor 6 to form the upper section of the macro-pixel, as illustrated in FIG. 5. The light ray passing through the upper section of the filter 26 reaches the sensor 6 to form the lower section of the macro-pixel, as illustrated in FIG. 5.

In this example, the lower section of the filter 26 has spectral characteristics with the short-wavelength peak value, and the upper section of the filter 26 has spectral characteristics with the long-wavelength peak value. Accordingly, the short-wavelength light rays correspond to the upper section of the macro-pixel, and the long-wavelength light rays correspond to the lower section of the macro-pixel.

The spectral reflectance can be obtained by calculating the average value for each row of macro-pixels, while considering the characteristics such as the spectral intensity of the light source, the spectral transmittance of the lens, the spectral transmittance of the filter, and the spectral sensitivity of the light receiving element.

FIG. 5 illustrates an enlarged view of the macro-pixel in FIG. 4. In this example, it is assumed that one macro-pixel has 23 pixels by 23 pixels. The spectral reflectance for one point of the object is obtained from this one macro-pixel. In the following example, the reflectance of the point having the shortest wavelength value $\lambda s$ is obtained.

The image capturing system 10 obtains the output value from the light receiving element (the sensor 6), which is the level of the light incident to the light receiving element. The light level is calculated as a product of the spectral intensity of the light source, the spectral reflectance of the object, the spectral transmittance of the optical system (main lens 24), the spectral transmittance of the filter 26, and the spectral sensitivity of the light receiving element 6. The spectral reflectance of the object at the wavelength value $\lambda s$ is obtained by dividing the output value by these four values other than the spectral reflectance.

In this example, the output value is obtained by dividing the total of output values of 23 pixels on the lowest raw of the macro-pixel in FIG. 5 by an area on which the macro-pixel is formed. The area on which the macro-pixel is formed is an area to which the light rays reach, that is, the area other than the black solid area in FIG. 5. Through this process, the output values are normalized for each raw of the macro-pixel. The relative value of the spectral reflectance of the object at the wavelength value $\lambda s$ is obtained as follows. The absolute value is obtained by correcting the relative value.

Figure 6:
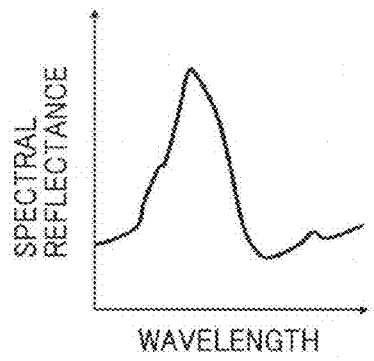
FIG. 6 is a graph illustrating the relationship between wavelength and spectral reflectance, according to an example embodiment of the present invention.

The spectral intensity of the light source, the spectral transmittance of the optical system (main lens 24), the spectral transmittance of the filter 26, and the spectral sensitivity of the light receiving element 6, and the area of each raw of the macro-pixel are known, as those values are determined based on a design of the image capturing device 10. Through performing the above-described calculation on each raw in the macro-pixel, the reflectance values are obtained for the total of 23 wavelength values, for example, as illustrated in FIG. 6. FIG. 6 illustrates the relationship between the relative values of spectral reflectance, and the wavelength values.

Further, the above-described operation of obtaining the spectral reflectance values for the total of 23 wavelength values is performed for all macro-pixels, thus obtaining the measurement of the two-dimensional spectral reflectance values.

Figure 7:
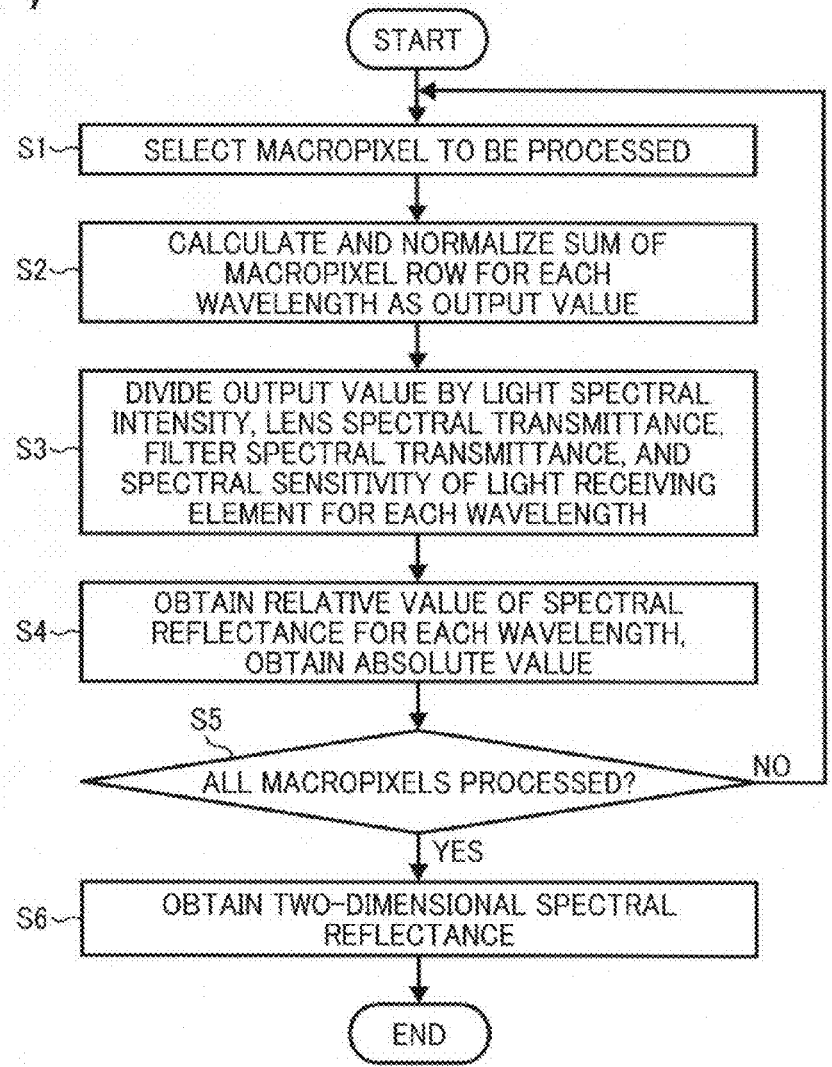
FIG. 7 is a flowchart illustrating operation of measuring two-dimensional, spectral reflectance, performed by the image capturing device of FIG. 2, according to an example embodiment of the present invention.

FIG. 7 illustrates operation of obtaining two-dimensional spectral reflectance values, performed by the spectrum calculator 16 of the image capturing system 10, according to an example embodiment of the present invention.

At S1, the spectrum calculator 16 selects a macro-pixel to be processed, in the captured image of FIG. 4.

At S2, the spectrum calculator 16 calculates the sum of output values of 23 pixels on the lowest raw of the macro-pixel, and divides the sum of output values by an area on which the macro-pixel is formed, to obtain the output value of the macro-pixel.

At S3, the spectrum calculator 16 divides the output value by the spectral intensity of the light source, the spectral transmittance of the optical system (main lens 24), the spectral transmittance of the filter 26, and the spectral sensitivity of the light receiving element 6.

At S4, the spectrum calculator 16 obtains the relative value of spectral reflectance, and the absolute value of the spectral reflectance.

At S5, the spectrum calculator 16 determines whether all macro-pixels are processed in the captured image. When it is determined that all macro-pixels are not processed ("NO" at S5), the operation returns to S1 to select a next marco-pixel to be processed. When it is determined that all macro-pixels are processed ("YES" at S5), the operation proceeds to S6.

At S6, the spectrum calculator 16 obtains the two-dimensional spectral reflectance values, which are the absolute values of spectral reflectance of the captured image.

Figure 8:
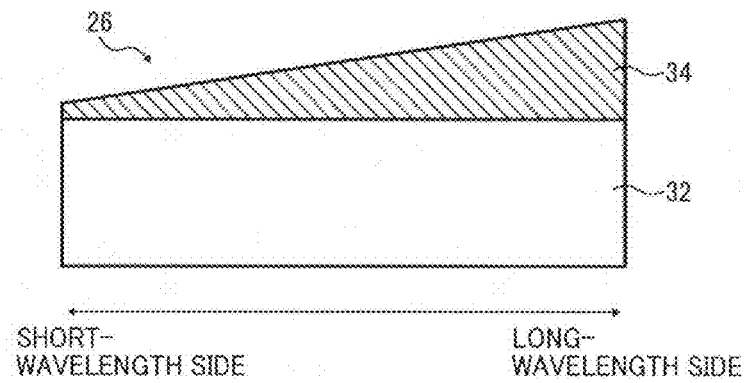
FIG. 8 is a schematic diagram illustrating a cross-sectional view of the filter.

In this example, as illustrated in FIG. 8, the filter 26 is made by depositing a thin film 34 on a transparent substrate 32 such as an optical glass, such that the thickness of the thin film 34 is caused to have a wedge shape. In this example, the thin film 34 is made of niobium pentoxide. Further, the short-wavelength side of the thin film 34, which corresponds to the short-wavelength section of the filter 26 (FIG. 3), may be made of niobium tantalum. The thin film 34 has a thickness of about several tens to several hundreds nm. The thin film 34 having a thinner thickness corresponds to the short-wavelength section of the filter 26, and the thin film 34 having a thicker thickness corresponds to the long-wavelength section of the filter 26. As the thickness of the wedge-shaped thin film 34 changes in non-stepwise, spectral transmittance sequentially changes depending on the position on the filter.

Further, as the spectral transmittance may be influenced by interference from light, transmitted lights are strengthened at the peak wavelength of spectral transmittance. The thickness of the transparent substrate 32 may have any desired value as long as it is sufficiently strong to hold the filter 26. In case the lens 24 is located closely to the diaphragm position S, the thickness of the transparent substrate 32 may be made thinner, for example, to have a value of about 0.5 mm.

Figure 9:
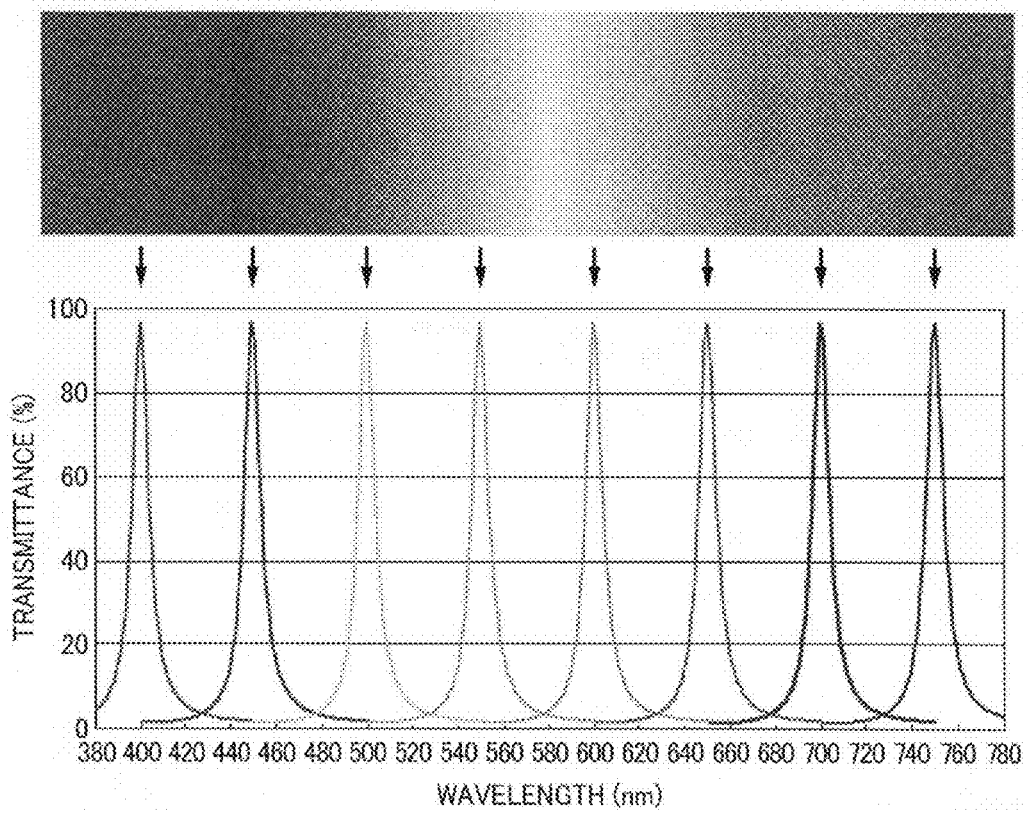
FIG. 9 is a graph illustrating the relationship between the position in a filter and transmittance, of the filter having spectral transmittance that sequentially changes.

FIG. 9 illustrates the relationship between the filter position and the transmittance, for a filter having spectral transmittance values that sequentially change. In this example illustrated in FIG. 9, a linear variable filter manufactured by Nikon is used. By using the filter with spectral transmittance values that sequentially change, a sequence of spectral reflectance values, which corresponds to the two-dimensional spectral reflectance, can be obtained at once by capturing a spectral image of the object. This eliminates a need for estimating spectral reflectance, for example, using statistics of spectral information of an object. As a result, the spectral reflectance can be easily obtained with improved robustness to noise.

The filter 26 with spectral transmittance values that sequentially and spatially change may be designed in various other ways.

Figure 10:
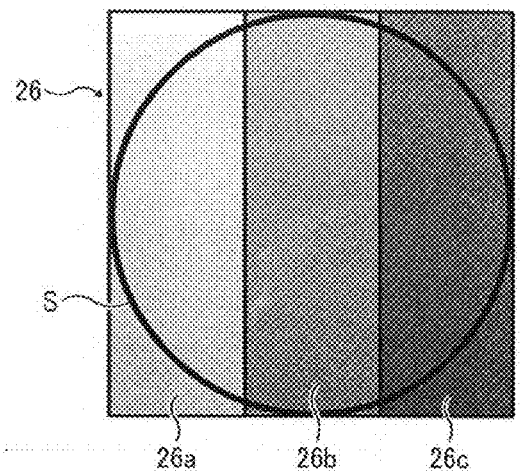
FIG. 10 is a front view illustrating a filter and a diaphragm of the image capturing device of FIG. 2, according to an example embodiment of the present invention.

FIG. 10 is a front view illustrating the filter 26 and the diaphragm S, according to an example embodiment of the present invention.

In this example of FIG. 10, the filter 26 is divided into a plurality of sections by transmittance range. More specifically, the filter 26 includes a filter 26a corresponding to the wavelength range of 400 nm to 500 nm, a filter 26b corresponding to the wavelength range of 500 nm to 600 nm, and a filter 26c corresponding to the wavelength range of 600 nm to 700 nm. In the filter 26, spectral transmittance sequentially changes in the infrared range or the ultraviolet range. In each of the filters 26a, 26b, and 26c, spectral transmittance values sequentially change, depending on the position in the filter. In this example illustrated in FIG. 10, the wavelength value increases in the direction from the upper side to the lower side.

The longitudinal directions of the filters 26a, 26b, and 26c do not have to be the same. More specifically, as long as the filter 26 has an area in which spectral transmittance sequentially and spatially changes, the spectral transmittance values may be changed in any direction. Further, as long as the filters 26a, 26b, and 26c respectively have at least a portion having a different wavelength range, the filters 26a, 26b, and 26c do not have to have spectral characteristics as described above referring to FIG. 10. Further, the specific value of the wavelength range of each filter is one example.

By dividing the filter 26 into a plurality of sections, the wavelength band corresponding to one pixel can be made narrow. With this filter 26 of FIG. 10, spectral transmittance can be measured with high wavelength resolution. Moreover, when compared with the case of using a long, thin filter, continuity of spectral transmittance may be assured even with the smaller diaphragm diameter.

Figure 11:
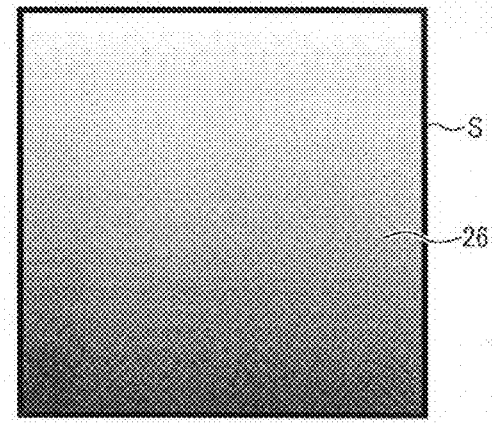
FIG. 11 is a front view illustrating a filter and a diaphragm of the image capturing device of FIG. 2, according to an example embodiment of the present invention.

FIG. 11 is a front view illustrating the filter 26 and the diaphragm S, according to an example embodiment of the present invention.

In this example, the diaphragm S has a rectangular shape. By making the diaphragm S to have a rectangular shape, the macro-pixel has a rectangular shape, thus increasing the number of pixels that can be processed when compared with the case of using the diaphragm S having a circular shape. More specifically, the black solid area between the adjacent macro-pixels in FIG. 4, which does not contribute to image formation, can be greatly reduced. This improves the S/N ratio of wavelength values for the pixels located at the upper or lower sides of the macro-pixel, thus increasing the accuracy in measuring the spectral reflectance.

Figure 12:
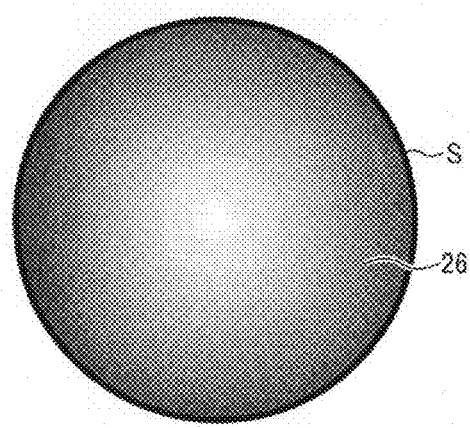
FIG. 12 is a front view illustrating a filter and a diaphragm of the image capturing device of FIG. 2, according to an example embodiment of the present invention.

FIG. 12 is a front view illustrating the filter 26 and the diaphragm S, according to an example embodiment of the present invention.

In the filter of FIG. 12, spectral transmittance values sequentially change in a concentric manner. This improves the S/N ratio of each wavelength value, even around the diaphragm having a circular shape, thus improving the accuracy in measuring the spectral reflectance.

In any one of the filters 26, the filter 26 may have a sequence of spectral transmittance values in a range other than the infrared or ultraviolet range. This allows the image capturing system 10 to measure spectral reflectance in an invisible area. The resultant measurement may be used to detect the difference in component or material, which may not be detectable by the human eye.

As described above, the image capturing device is provided with a sensor, in which spectral transmittance values of the sensor sequentially and spatially change. The lights from the object pass through the respective positions of the sensor to simultaneously form a plurality of types of spectral image of the object on an image plane of the sensor. With this configuration, a sequence of spectral reflectance values can be obtained at once through image capturing.

For example, in case of the background technology that estimates a sequence of spectral reflectance values from the output values of a plurality of bands that are discrete in wavelength, information regarding the object such as statistics of spectral data of the object is needed. Further, estimating based on statics may result in noise. In contrary, with the sensor that sequentially changes spectral transmittance values, a need for estimating spectral reflectance values can be eliminated, thus suppressing the influences from noise. Accordingly, the image capturing device has high robustness to noise, thus increasing accuracy in measuring the spectral reflectance of the object.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program. Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc. Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image capturing device, comprising:
    an optical system configured to focus lights from an object to generate optical information, the optical system including a diaphragm position along a center line of the optical system;
    a filter provided along the center line of the optical system, the filter having a plurality of types of spectral characteristics;
    a sensor configured to convert the optical information of the object to electronic data, the sensor having a plurality of spectral transmittance values that sequentially and spatially change; and a lens array provided between the optical system and the sensor and configured to have a plurality of lenses being arranged in substantially parallel in a direction of a two-dimensional surface of the sensor, wherein the lights from the object pass through the respective positions of the sensor to simultaneously form a plurality of types of spectral image of the object on an image plane of the sensor, wherein the filter includes a transparent substrate and a thin film formed on the transparent substrate, wherein the thin film formed on the transparent substrate has a wedge-shape thickness such that a first side area of the thin film has a first thickness, and a second side area of the thin film has a second thickness, wherein the second thickness is greater that the first thickness, and wherein the wedge-shaped thickness of the thin film changes in a non-stepwise manner from the first side area to the second side area.

2. The image capturing device of claim 1, wherein the filter includes a plurality of filter areas each having spectral characteristics different from one another.

3. The image capturing device of claim 1, wherein the filter includes a plurality of filters, each filter including at least a part having a wavelength range different from a wavelength range of at least a part of another filter.

4. The image capturing device of claim 1, wherein the optical system includes a diaphragm having a rectangular shape.

5. The image capturing device of claim 1, wherein the spectral transmittance values on the filter sequentially change in a concentric manner from a center of the filter.

6. The image capturing device of claim 1, wherein the spectral transmittance values on the filter sequentially change in an ultraviolet or an infrared range.

7. The image capturing device of claim 1,
wherein a change in thickness of the thin film corresponds to a change in spectral transmittance of the filter.

8. The image capturing device of claim 7, wherein the thin film is made of niobium pentoxide.

9. An image capturing system, comprising:
the image capturing device of claim 1; and
a spectrum calculator configured to calculate a spectrum for each pixel, using the plurality of types of spectral image obtained from the image capturing device.

10. The image capturing device of claim 1, wherein the first side area is a short-wavelength side area made of niobium tantalum.

11. The image capturing device of claim 1, wherein the first side area of the thin film corresponds to a short-wavelength section of the filter, and the second side area of the thin film corresponds to a long-wavelength section of the filter.

* * * * *